United States Patent
Wang et al.

(10) Patent No.: US 12,342,211 B2
(45) Date of Patent: Jun. 24, 2025

(54) NETWORK ACCESS METHOD, APPARATUS AND DEVICE

(71) Applicants: QINGDAO HAIER WASHING MACHINE CO., LTD., Shandong (CN); HAIER SMART HOME CO., LTD., Shandong (CN)

(72) Inventors: Zizhen Wang, Qingdao (CN); Zhenxing Huang, Qingdao (CN); Sheng Xu, Qingdao (CN)

(73) Assignees: QINGDAO HAIER WASHING MACHINE CO., LTD. (CN); HAIER SMART HOME CO., LTD. (CN)

( * ) Notice: Subject to any disclaimer, the term of this patent is extended or adjusted under 35 U.S.C. 154(b) by 434 days.

(21) Appl. No.: 18/086,235

(22) Filed: Dec. 21, 2022

(65) Prior Publication Data
US 2023/0117118 A1 Apr. 20, 2023

Related U.S. Application Data

(63) Continuation of application No. PCT/CN2021/098543, filed on Jun. 7, 2021.

(30) Foreign Application Priority Data

Jun. 24, 2020 (CN) .......................... 202010584448.8

(51) Int. Cl.
*H04W 28/02* (2009.01)
*H04L 9/40* (2022.01)
(Continued)

(52) U.S. Cl.
CPC ........... *H04W 28/0226* (2013.01); *H04L 9/40* (2022.05); *H04W 48/08* (2013.01); *H04W 84/20* (2013.01)

(58) Field of Classification Search
None
See application file for complete search history.

(56) References Cited

U.S. PATENT DOCUMENTS

2010/0157888 A1 6/2010 Aggarwal et al.
2020/0305061 A1* 9/2020 Tao ....................... H04W 40/30
(Continued)

FOREIGN PATENT DOCUMENTS

CN 101790233 A 7/2010
CN 105636144 A 6/2016
(Continued)

OTHER PUBLICATIONS

"Research on Algorithm of Cluster Head Selection in D2D Multicast-Communication" of China Academic Publishing House, dated Apr. 15, 2018.
(Continued)

*Primary Examiner* — Minh Trang T Nguyen
(74) *Attorney, Agent, or Firm* — Quarles & Brady LLP

(57) ABSTRACT

The present application provides a network access method, apparatus and device, the method includes: acquiring device information of a mesh network device after registration; determining a first master node set to be connected according to the device information of the mesh network device; determining a first target master node device from the first master node set based on a master node selection manner, determining the device group corresponding to the first target master node device, and acquiring a target node device in the device group corresponding to the first target master node device; and connecting the mesh network device to the target node device to enable a terminal device connected to the mesh network device to realize network access through a communication link corresponding to the mesh network device.

20 Claims, 4 Drawing Sheets

(51) Int. Cl.
*H04W 48/08* (2009.01)
*H04W 84/20* (2009.01)

(56) References Cited

U.S. PATENT DOCUMENTS

2020/0305062 A1* 9/2020 Kharvar ................ H04W 84/18
2021/0099948 A1* 4/2021 An ........................ H04W 48/16

FOREIGN PATENT DOCUMENTS

| CN | 108366019 A | 8/2018 |
| CN | 108738005 A | 11/2018 |
| CN | 109819427 A | 5/2019 |
| CN | 110089089 A | 8/2019 |
| CN | 110278568 A | 9/2019 |
| EP | 1548985 A1 | 6/2005 |
| WO | 2015088377 A1 | 6/2015 |

OTHER PUBLICATIONS

Chih-Min Yu et al., "Joint Layer-Based Formation and Self-Routing Algorithm for Bluetooth Multihop Networks" by IEEE Systems Journal, dated Apr. 19, 2016.
Office Action for Chinese Application No. 202010584448.8, dated Sep. 7, 2024.
Notification to Grant Patent Rights for Invention for Chinese Application No. 202010584448.8, dated Dec. 1, 2024.
International Search Report and Written Opinion, PCT Application No. PCT/CN2021/098543 dated Jun. 7, 2021.

* cited by examiner

NETWORK ACCESS METHOD, APPARATUS AND DEVICE

CROSS-REFERENCE TO RELATED APPLICATIONS

This application is a continuation of International Application No. PCT/CN2021/098543, filed on Jun. 7, 2021, which claims priority to Chinese Patent Application No. 202010584448.8, filed to the China National Intellectual Property Administration on Jun. 24, 2020, and entitled "Network Access Method, Apparatus and Device". The disclosures of the aforementioned applications are hereby incorporated by reference in their entireties.

TECHNICAL FIELD

The present application relates to the field of communication technologies, and in particular, to a network access method, apparatus and device.

BACKGROUND

With the development of transmission technology, Bluetooth technology will become a basic technology in the Internet of Things, more and more developers will choose Bluetooth to build their own Internet of Things solutions. A new Bluetooth Mesh technology is suitable for one-to-many wireless communication scenarios, and improves the communication efficiency of building large-scale network coverage. Specifically, the Bluetooth Mesh technology will be more suitable for scenarios in which smart home, building automation and wireless sensor networks need thousands of devices to transmit data under a secure, reliable and stable environment.

Taking the smart home as an example, when the number of terminal devices connected to the home network is increasing, the Bluetooth Mesh technology, due to its one-to-many communication characteristics, may realize modifying a manner in which a conventional communication device can transmits data with only one terminal device at the same time to transmitting data with a plurality of terminal devices at the same time, so that the plurality of terminal devices can achieve data access at the same time, which improves the data access efficiency of the terminal devices.

However, in the prior art, the Bluetooth mesh technology transmits data in a broadcast manner in the network. When broadcast is adopted for transmission, when the number of mesh network devices in the same network increases, the amount of data transmitted in the network also significantly increases. When the amount of data transmitted in the network exceeds a preset value, the problems that the response of the mesh network device is slowed down and the network load is increased may occur, which affects the normal online process of an user, and further affects the online experience of the user.

SUMMARY

In order to solve the problems existing in the prior art, the present application provides a network access method, apparatus and device.

In order to achieve the above purposes, embodiments of the present application provide the following technical solutions.

In a first aspect, the present application discloses a network access method including: acquiring device information of a mesh network device after registration; determining a first master node set to be connected according to the device information of the mesh network device, where the first master node set includes at least one master node device; determining a first target master node device to be connected by the mesh network device from the first master node set based on a pre-stored master node selection manner, determining a device group corresponding to the first target master node device, and acquiring a target node device corresponding to a leaf node in the device group corresponding to the first target master node device; and connecting the mesh network device to the target node device to enable a terminal device connected to the mesh network device to realize network access through a communication link corresponding to the mesh network device.

Based on the above technical content, data involved in the process of the terminal device accessing the network is transmitted only on a communication link from the mesh network device to the first target master node device, which does not affect other links, reduces the problems of slow device response and heavy network load caused by the whole network broadcast manner, ensures the normal online process of the user, and improves the online experience of the user.

In an implementation, the first master node set includes one master node device, and the determining the first target master node device to be connected by the mesh network device from the first master node set based on the pre-stored master node selection manner includes: determining the master node device in the first master node set as the first target master node device to be connected by the mesh network device based on the pre-stored master node selection manner, specifically, the master node device can be directly set as the first target master node device.

In an implementation, the first master node set includes a plurality of master node devices, and the determining the first target master node device to be connected by the mesh network device from the first master node set based on the pre-stored master node selection manner includes: determining weight values of the mesh network device and the master node devices in the first master node set based on the pre-stored master node selection manner to obtain a weight value set, where the weight values of the mesh network device and the master node devices in the first master node set are positively correlated with the number of nodes passed by the mesh network device to the master node devices in the first master node set; acquiring a target weight value from the weight value set, where the target weight value is a weight value with a smallest value in the weight value set; and acquiring a first target master device corresponding to the target weight value from the first master node set.

In order to improve the efficiency of data transmission and reduce the delay, the number of the master node devices in the first master node set may be set as 2-3. In an ideal state, the weight value of the mesh network is 1, and the maximum weight value may be 5-8, and generally not more than 6.

In an implementation, the device information of the mesh network device includes location information of the mesh network device, and the determining the first master node set to be connected according to the device information of the mesh network device includes: by taking the location information of the mesh network device as a center, determining first master node devices within a first preset range from the center according to the location information of the mesh network device, to obtain the first master node set.

In an implementation, the method further includes: when any mesh network device in a network is monitored to move, updating attribute information of a mobile mesh network device to a mobile node; acquiring location information of the mesh network device of which the attribute information is the mobile node, and by taking the location information of the mesh network device of which the attribute information is the mobile node as a center, determining second master node devices within a second preset range from the center to obtain a second master node set; determining a second target master node device from the second master node set according to the master node selection manner; determining a target slave node device from slave node devices subordinate to the second target master node device according to the location information of the mesh network device of which the attribute information is the mobile node; and connecting the mesh network device of which the attribute information is the mobile node to the target slave node device.

The second preset range may be the same as the first preset range, and may also be different from the first preset range. Exemplarily, the second preset range may be smaller than the first preset range, and may be 2-5 m.

In an implementation, before connecting the mesh network device of which the attribute information is the mobile node to the target slave node device, the method further includes: determining whether the number of mesh network devices of which the attribute information is the mobile node currently connected by the target slave node device is exceeds a preset number threshold; and if exceeding, performing a step of determining another target slave node device from the slave node devices subordinate to the second target master node device, according to the location information of the mesh network device of which the attribute information is the mobile node and steps thereafter again until determining that no new target slave node device exceeds the number threshold.

In the embodiments of the present application, in order to avoid affecting the response speed of the device due to excessive data transmitted in the communication link, it may be set the number threshold of the mesh network device of which the attribute information is the mobile node currently connected by the target slave node device. If the number threshold is exceeded, it is determined that the number of the mesh network device of which the attribute information is the mobile node currently connected by the other slave node device in the device group in which the target slave node devices are located, and if the number of the mesh network device of which the attribute information is the mobile node currently connected by the other slave node device does not exceed the number threshold, the mesh network device of which the attribute information is the mobile node is connected to the other slave node devices. Where the number threshold may be any of 3-6.

In an implementation, the method further includes: if the number of the mesh network devices of which the attribute information is the mobile node connected by the slave node device subordinate to the second target master node device is the mobile node each exceeds the number threshold, adjusting the number threshold and connecting the mesh network devices of which the attribute information is the mobile node to an original target slave node device, where the original target slave node device is determined from the slave node devices subordinate to the second target master node device according to the location information of the mesh network device of which the attribute information is the mobile node.

In a second aspect, the present application discloses a network access apparatus including:
an acquiring module, configured to acquire device information of a mesh network device after registration; and
a determining module, configured to determine a first master node set to be connected according to the device information of the mesh network device, where the first master node set includes at least one master node device; the determining module is further configured to determine a first target master node device to be connected by the mesh network device from the first master node set based on a pre-stored master node selection manner, determine a device group corresponding to the first target master node device, and acquire a target node device corresponding to a leaf node in the device group corresponding to the first target master node device; and the determining module is further configured to connect the mesh network device to the target node device to enable a terminal device connected to the mesh network device to realize network access through a communication link corresponding to the mesh network device.

Based on the above technical content, in the present application, data involved in the process of the terminal device accessing the network is transmitted only on a communication link from the mesh network device to the first target master node device, which does not affect other links, reduces the problems of slow device response and heavy network load caused by the whole network broadcast manner, ensures the normal online process of the user, and improves the online experience of the user.

In a third aspect, the present application discloses network access device including at least a processor and a memory; where the memory stores computer-executable instructions; and the at least one processor executes the computer-executable instructions stored in the memory, so that the at least one processor executes the network access method according to any one of the first aspect.

In a fourth aspect, the present application discloses a computer-readable storage medium, where the computer-readable storage medium stores computer-executable instructions, when a processor executes the computer-executable instructions, the network access method according to any one of the first aspect is implemented.

In a fifth aspect, the present application provides a computer program product including a computer program, when a processor executes the computer program, the computer program performs the network access method according to any one of the first aspect.

With reference to the above technical solutions, the present application discloses a network access method, apparatus and device, after adopting the above solution, the device information of the mesh network device after registration may be first acquired, the first master node set to be connected is determined according to the device information of the mesh network device, the first target master node device to be connected by the mesh network device is determined from the first master node set based on the pre-stored master node selection manner, the device group corresponding to the first target master node device is determined, the target node device corresponding to the leaf node in the device group corresponding to the first target master node device is acquired, and the mesh network device is connected to the target node device. Therefore, the terminal device connected to the mesh network device may implement the network access through the communication link corresponding to the mesh network device, that is, data involved in the process of the terminal device accessing the network is transmitted only on the communication link from the mesh network device to the first target master node device, which does not affect other links, reduces the problems of slow device response and heavy network load caused by the whole network broadcast manner, ensures the normal online process of the user, and improves the online experience of the user.

DESCRIPTION OF EMBODIMENTS

Figure 1:
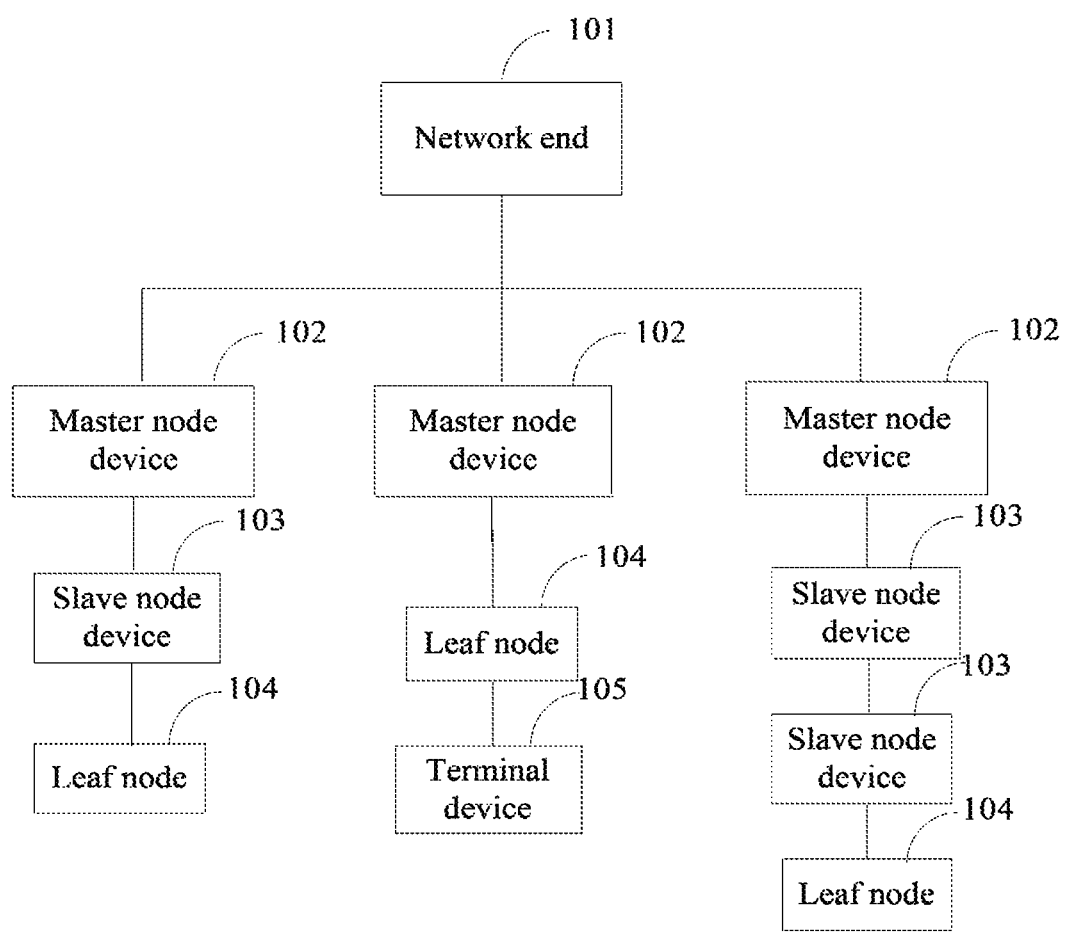
FIG. 1 is an architectural diagram of an application system of a network access method provided in an embodiment of the present application.

First, it should be understood by those skilled in the art that these implementations are used only to explain the technical principles of the present application and are not intended to limit the protection scope of the present application. Those skilled in the art may adjust them as necessary to adapt to specific application occasions.

Second, it is to be noted that in the description of the present application, terms such as "inside" and "outside" indicating a direction or a location relationship are based on the direction or the location relationship shown in the drawings, which is only for the purpose of convenient description, rather than indicating or implying that the apparatus or a member must have a specific orientation, be constructed and operated in the specific direction, and therefore cannot be understood as a limit to the present application.

In addition, it is also to be noted that in the description of the present application, unless otherwise specified and defined, terms "connecting" and "connection" should be understood in a broad sense, for example, it may be a fixed connection, a detachable connection, or an integral connection; it may be a mechanical connection or an electrical connection; it may be directly connected, or may be indirectly connected by an intermediate medium, or may be an interconnection within two members. For those skilled in the art, the specific meaning of the above terms in the present application may be understood in specific situations.

So far, the technical solutions of the present application have been described in connection with the preferred implementations shown in the drawings, however, it is readily understood by those skilled in the art that the protection scope of the present application is obviously not limited to these specific implementations. Without departing from the principles of the present application, those skilled in the art may make equivalent changes or replacements to related technical features, and the technical solutions after such changes or replacements would all fall within the protection scope of the present application.

In the prior art, when transmitting data, Bluetooth mesh technology transmits it in a broadcast manner in the network. For example, a Bluetooth mesh device networking, it is necessary to first bind the device to the home network, and the transmission is performed in the home network in a manner of broadcast. When broadcast is adopted for transmission, when the number of mesh network devices in the same network increases, the amount of data transmitted in the network also significantly increases. When the amount of data transmitted in the network exceeds a preset value, the problems that the response of the mesh network device is slowed down and the network load is increased may occur, which affects the normal online process of the user and the online experience of the user.

Based on the above problems, in the present application, master node devices are grouped and then the network access manner is implemented according to a group, so that a terminal device connected to the network device in a group corresponding to a master node implements network access through a communication link from the mesh network device to a first target master node device, which reduces the problems of slow device response and heavy network load caused by the whole network broadcast manner, and achieves the technical effects of not only ensuring the normal online process of the user but also improving the online experience of the user.

FIG. 1 is an architectural diagram of an application system of a network access method provided in an embodiment of the present application, as shown in FIG. 1, the application system includes a network end 101, a master node device 102, a slave node device 103 under the master node device and a terminal device 105, where the last slave node device under the master node device 102 may be referred to as a leaf node, and when no other slave node device is connected under the master node device, the master node device itself may be referred to as a leaf node. The terminal device 105 may be connected to the leaf node and realize accessing to the network through the leaf node. Exemplarily, a node device 104 in FIG. 1 may be referred to as a leaf node 104. In addition, the master node device 102 and related slave node devices thereof may be divided into a device group. Exemplarily, there are three master node devices in FIG. 1, and correspondingly, there are three device groups.

Figure 2:
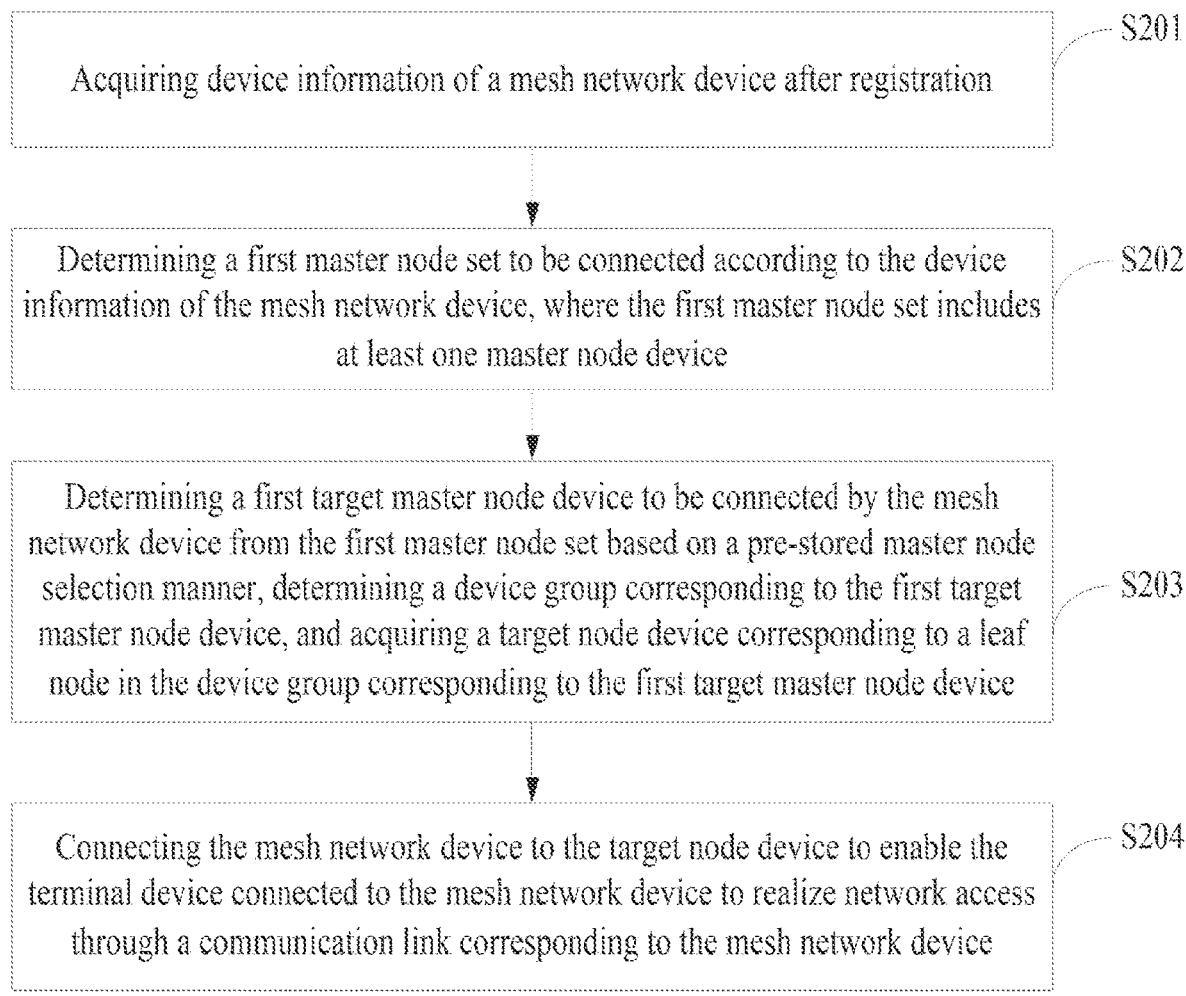
FIG. 2 is a flow chart of a network access method provided in an embodiment of the present application.

FIG. 2 is a flow chart of a network access method provided in an embodiment of the present application. As shown in FIG. 2, the method of this embodiment may include the following.

S201: acquiring device information of a mesh network device after registration.

In this embodiment, when the mesh network device is to be connected to the network as a node, it is necessary to first register the mesh network device and determine basic information of the mesh network device, for example, the basic information may include the name, the number, the model and the login password of the mesh network device. Only after the registration of the mesh network device is completed, the mesh network may be connected to the mesh network as a node, and realize the interaction with the terminal device data. In addition, in order to improve the accuracy of the mesh network device connecting to the network as a node, the device information of the registered mesh network device may be acquired when connected to the network, where the device information of the mesh network device may include location information of the mesh network device.

Further, the location information of the mesh network device may be determined by the mesh network device in real time, or may be stored in the mesh network device after being determined in advance.

S202: determining a first master node set to be connected according to the device information of the mesh network device, where the first master node set includes at least one master node device.

In this embodiment, after acquiring the device information of the mesh network device, the first master node set to be connected may be determined according to the acquired device information of the mesh network device. Further, when the device information of the mesh network device is the location information of the mesh network device, first master node devices with in a first preset range from the location information of the mesh network device which is taken as a center according to the location information of the mesh network device are determined, to obtain the first master node set. Where the first preset range may be customized according to actual conditions, for example, the first preset range may be 1 m-10 m.

S203: determining a first target master node device to be connected by the mesh network device from the first master node set based on a pre-stored master node selection manner, determining a device group corresponding to the first target master node device, and acquiring a target node device corresponding to a leaf node in the device group corresponding to the first target master node device.

In this embodiment, different first target master node devices correspond to different device groups, after acquiring the first master node set, the first target master node device to be connected may be first determined from the first master node set, and then the device group corresponding to the first target master node device may be determined. In addition, when the mesh network device is connected to the network, it is connected to the target node device corresponding to the leaf node in the device group, that is, the node device corresponding to the last node in the device group.

In addition, the device group corresponding to the first master node device may include a device directly or indirectly connected to the first master node device, and also include the first master node device itself. Generally, the leaf node refers to the device corresponding to the last node in the communication link corresponding to the first master node device. When the device group corresponding to the first master node device includes only the first master node device, the target node device corresponding to the leaf node in the device group is the first master node device itself.

Further, if the number of master node devices included in the first master node set is different, the manner of determining the first target master node device may be different. Where the first master node set may include one or more master node devices.

When the first master node set includes one master node device, an implementation of determining the first target master node device to be connected by the mesh network device from the first master node set based on the pre-stored master node selection manner may be: determining the master node device in the first master node set as the first target master node device to be connected by the mesh network device based on the pre-stored master node selection manner.

Specifically, when the first master node set includes only one master node device, the master node device may be directly set as the first target master node device.

When the first master node set includes a plurality of master node devices, an implementation of determining the first target master node device to be connected by the mesh network device from the first master node set based on the pre-stored master node selection manner may be:
determining weight values of the mesh network device and the master node devices in the first master node set based on the pre-stored master node selection manner to obtain a weight value set, where the weight values of the mesh network device and the master node devices in the first master node set are positively correlated with the number of nodes passed by the mesh network device to each master node device in the first master node set; and
acquiring a target weight value from the weight value set, where the target weight value is a weight value with a smallest value in the weight value set; and acquiring the first target master node device corresponding to the target weight value from the first master node set.

Specifically, when the first master node set includes a plurality of master node devices, the first target master node device may be determined by selecting the weight value. Where the weight values of the mesh network device and the master node device in the first master node set are positively correlated with the number of nodes passed by the mesh network device to the master node devices in the first master node set. For example, the weight values of the mesh network device and the master node devices in the first master node set may be the number of nodes passed from the leaf node to be connected by the mesh network device to the master node device. The larger the weight value, the more the number of the passed nodes, the greater possibility of the data delay, and therefore, after the weight value set is determined, the weight value with the smallest value may be acquired from the weight value set as the target weight value, and the first target master node device corresponding to the target weight value may be acquired from the first master node set.

Further, in order to improve the efficiency of data transmission and reduce the delay, the number of the master node devices in the first master node set may be set as 2-3. In the ideal state, the weight value in the mesh network is 1, and the maximum weight value may be 5-8, and generally not more than 6.

In a specific example, when there are a plurality of master nodes in the effective communication distance of the mesh network device, weight values of the mesh network device to the master nodes need to be compared, that is, the number of non-repetitive nodes passed by the leaf node connected by the mesh network device to the master nodes. For example, the master node A corresponds to a group A, and there are three nodes in the group; the master node B corresponds to a group B, and there are four nodes in the group, that is, the maximum weight of the network access node connected to the master node A is 3, and the maximum weight of the network access node connected to the master node B is 4. In order to reduce the delay, the mesh network device may be allocated to the master node A with less weight value, and there are four nodes in group A after allocation.

S204: connecting the mesh network device to the target node device to enable the terminal device connected to the mesh network device to realize network access through a communication link corresponding to the mesh network device.

In this embodiment, after the target node device to be connected by the mesh network device is determined, the mesh network device may be directly connected to the target node device. After the mesh network device is connected to the target node device, the terminal device may be directly connected to the mesh network device, and then the terminal device may implement the network access through a communication link from the mesh network device to the target node device and finally to the first target master node device. If the mesh network device is directly connected to the first target master node device, the terminal device may implement the network access through a communication link from the mesh network device to the first target master node device. In a specific example, the terminal device may be a smartphone, a smart television and a washing machine, and after the smartphone, the smart television and the washing machine are all connected to the mesh network device, the network access may be implemented through a communication link from the mesh network device to the first target master node device.

After adopting the above solution, the device information of the mesh network device after registration may be first acquired, the first master node set to be connected is determined according to the device information of the mesh network device, the first target master node device to be connected by the mesh network device is determined from the first master node set based on the pre-stored master node selection manner, the device group corresponding to the first target master node device is determined, the target node device corresponding to the leaf node in the device group corresponding to the first target master node device is acquired, and the mesh network device is connected to the target node device. Therefore that the terminal device connected to the mesh network device may implement the network access through the communication link corresponding to the mesh network device, that is, data involved in the process of the terminal device accessing the network is transmitted only on the communication link from the mesh network device to the first target master node device, which does not affect other links, reduces the problems of slow device response and heavy network load caused by the whole network broadcast manner, ensures the normal online process of the user, and improves the online experience of the user.

The following describes the technical solutions of the present application in detail with specific embodiments. The following specific embodiments may be combined with each other, and same or similar concepts or processes may not be described again in some embodiments.

Figure 3:
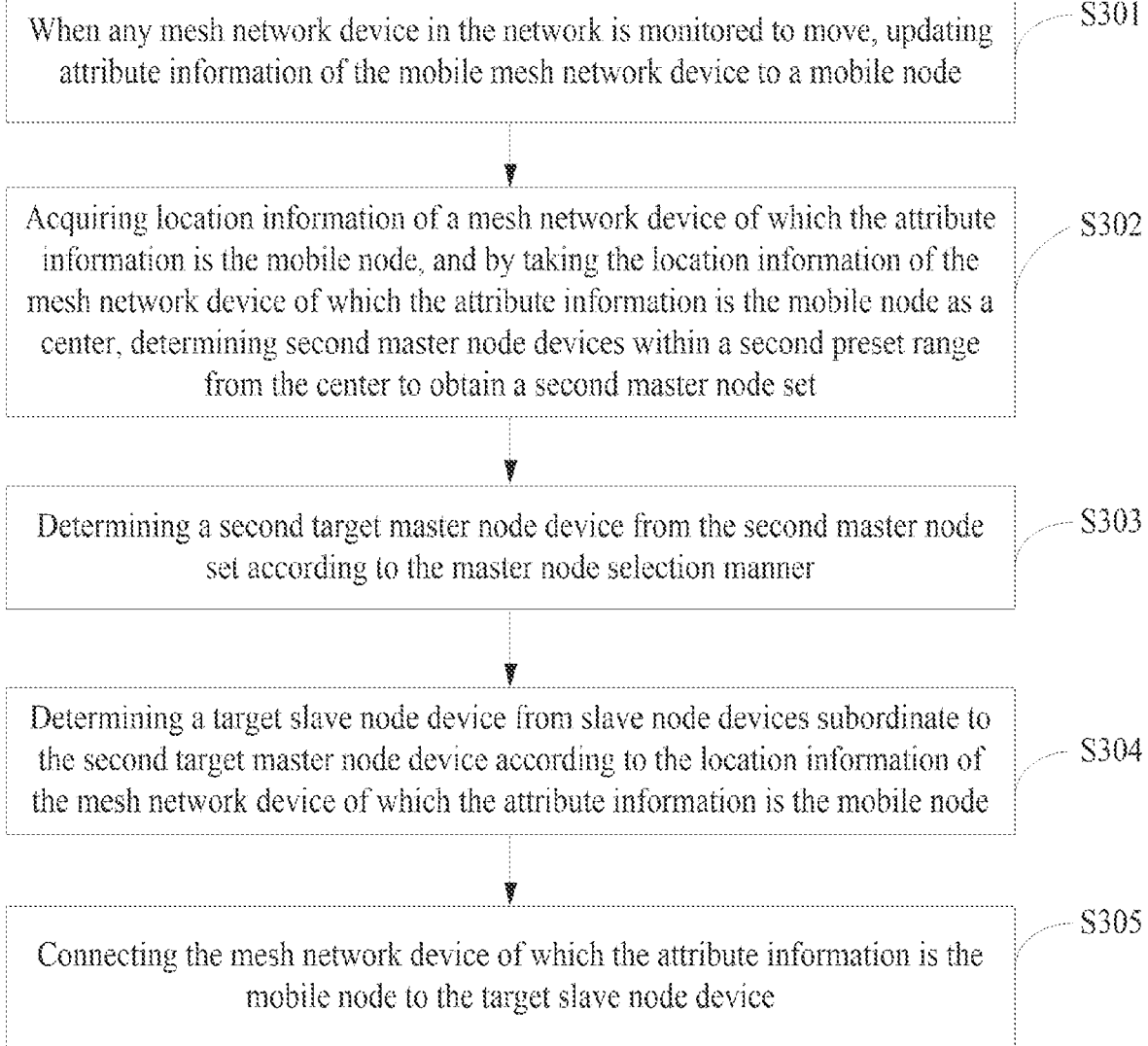
FIG. 3 is a flow chart of a network access method provided in another embodiment of the present application.

FIG. 3 is a flow chart of a network access method provided in another embodiment of the present application. As shown in FIG. 3, the method may further include the following.

S301: when any mesh network device in the network is monitored to move, updating attribute information of the mobile mesh network device to a mobile node.

S302: acquiring location information of a mesh network device of which the attribute information is the mobile node, and by taking the location information of the mesh network device of which the attribute information is the mobile node as a center, determining second master node devices within a second preset range from the center to obtain a second master node set.

S303: determining a second target master node device from the second master node set according to the master node selection manner.

S304: determining a target slave node device from slave node devices subordinate to the second target master node device according to the location information of the mesh network device of which the attribute information is the mobile node.

S305: connecting the mesh network device of which the attribute information is the mobile node to the target slave node device.

In this embodiment, a motion sensor carried in the mesh network device may automatically detect the movement of the device. When the motion sensor detects the movement of the mesh network device, the attribute information of the mobile mesh network device may be updated to the mobile node.

In addition, when the mesh network device of which the attribute information is the mobile node is to be connected to the network, the location information of the mesh network device of which the attribute information is the mobile node may be first acquired, and by taking the location information of the mesh network device of which the attribute information is the mobile node as the center, the second master node devices within the second preset range from the center are determined to obtain the second master node set. Where the second preset range may be the same as or different from the first preset range. Exemplarily, the second preset range may be smaller than the first preset range, and may be 2-5 m.

In addition, there may be one second master node device or a plurality of second master node devices in the second master node set. When there is one second master node device in the second master node set, the second target master node device may be determined according to a method similar to determining the first target master node device when there is one first master node device in the first master node set. When there are a plurality of second master node devices in the second master node set, the second target master node device may be determined according to a method similar to determining the first target master node device when there are a plurality of first master node devices in the first master node set. In addition, since the mesh network device of which the attribute information is the mobile node cannot be directly connected to the target master node device, it is connected to the node group by connecting to other slave node devices subordinate to the second target master node device in the device group in which the target master node device is located, so as to realize the network access.

In addition, before the mesh network device of which the attribute information is the mobile node is connected to the target slave node device, the method may further include:

determining whether the number of mesh network devices of which the attribute information is the mobile node currently connected by the target slave node device exceeds a preset number threshold. If exceeding, performing a step of determining another target slave node device from the slave node devices subordinate to the second target master node device, according to the location information of the mesh network device of which the attribute information is the mobile node and steps thereafter again until determining that no new target slave node device exceeds the number threshold.

Specifically, in order to avoid affecting the response speed of the device due to excessive data transmitted in the communication link, it may be set the number threshold of the mesh network device of which the attribute information is the mobile node currently connected by the target slave node device. If the number threshold is exceeded, it is determined that the number of the mesh network device of which the attribute information is the mobile node currently connected by the other slave node device in the device group in which the target slave node devices are located, and if the number of the mesh network device of which the attribute information is the mobile node currently connected by the other slave node device does not exceed the number threshold, the mesh network device of which the attribute information is the mobile node is connected to the other slave node devices.

In addition, if the number of the mesh network device of which the attribute information is the mobile node currently connected by the target slave node device does not exceed the number threshold, the mesh network device is directly connected to the target slave node device. Where the number threshold may be any of 3-6.

In addition, if the number of mesh network devices of which the attribute information is the mobile node connected by the slave node devices subordinating to the second target master node device each exceeds the number threshold, the number threshold is up-adjusted, and the mesh network device of which the attribute information is the mobile node is connected to an original target slave node device, where the original target slave node device is determined from the slave node devices subordinate to the second target master node device according to the location information of the mesh network device of which the attribute information is the mobile node.

Specifically, when the number of the mesh network devices of which the attribute information is the mobile node connected by the slave node device of the second target master node device each exceeds the number threshold, it indicates that the number threshold may not be set reasonably, and it is necessary to up-adjust the number threshold appropriately to realize the connection of the mesh network device of which the attribute information is the mobile node. Further, in order to avoid an insignificant effect of the number threshold setting, a range of each up-adjustment may be 2-3.

Figure 4:
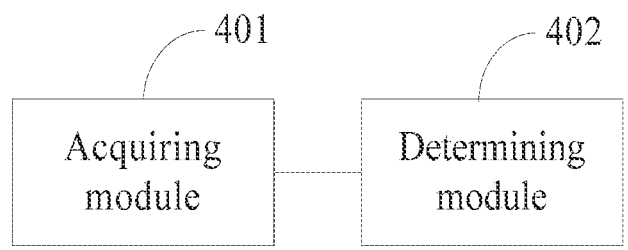
FIG. 4 is a schematic structural diagram of a network access apparatus provided in an embodiment of the present application.

FIG. 4 is a schematic structural diagram of a network access apparatus provided in an embodiment of the present application. As shown in FIG. 4, the apparatus may include:
- an acquiring module 401, configured to obtain device information of a mesh network device after registration; and
- a determining module 402, configured to determine a first master node set to be connected according to the device information of the mesh network device, where the first master node set includes at least one master node device.

The determining module 402 is further configured to determine a first target master node device to be connected by the mesh network device from the first master node set based on a pre-stored master node selection manner, determine a device group corresponding to the first target master node device, and acquire a target node device corresponding to a leaf node in the device group corresponding to the first target master node device.

In addition, the first master node set includes a master node device, and the determining module 402 is further configured to determine the master node device in the first master node set as a first target master node device to be connected by the mesh network device based on the pre-stored master node selection manner.

In addition, the first master node set includes a plurality of master node devices, and the determining module 402 is further configured to:
- determine weight values of the mesh network device and the master node devices in the first master node set based on the pre-stored master node selection manner to obtain a weight value set, where the weight values of the mesh network device and the master node devices in the first master node set are positively correlated with the number of nodes passed by the mesh network device to the master node devices in the first master node set;
- acquiring a target weight value from the weight value set, where the target weight value is a weight value with a smallest value in the weight value set; and
- acquiring the first target master device corresponding to the target weight value from the first master node set.

The determining module 402 is further configured to connect the mesh network device to the target node device to enable a terminal device connected to the mesh network device to realize network access through a communication link corresponding to the mesh network device.

In addition, in another embodiment, the determining module 402 is further configured to:
- by taking the location information of the mesh network device as a center, determine first master node devices within a first preset range from the center according to the location information of the mesh network device, to obtain a first master node set.

In addition, the determining module 402 is further configured to:
- when any mesh network device in a network is monitored to move, update attribute information of a mobile mesh network device as a mobile node;
- acquire location information of the mesh network device of which the attribute information is the mobile node, and by taking the location information of the mesh network device of which the attribute information is the mobile node as a center, determine second master node devices within a second preset range from the center to obtain a second master node set;
- determine a second target master node device from the second master node set according to the master node selection manner;
- determine a target slave node device from slave node devices subordinate to the second target master node device according to the location information of the mesh network device of which the attribute information is the mobile node; and
- connect the mesh network device of which the attribute information is the mobile node to the target slave node device.

In addition, the determining module 402 is further configured to:
- determine whether the number of mesh network devices of which the attribute information is the mobile node currently connected by the target slave node device exceeds a preset number threshold; and
- if exceeding, performing a step of determining another target slave node device from the slave node devices subordinate to the second target master node device, according to the location information of the mesh network device of which the attribute information is the mobile node and steps thereafter again until determining that no new target slave node device exceeds the number threshold.

In addition, the determining module 402 is further configured to:
- if the number of the mesh network devices of which the attribute information connected by the slave node device subordinate to the second target master node device is the mobile node each exceeds the number threshold, adjusting the number threshold and connecting the mesh network devices of which the attribute information is the mobile node to an original target slave node device, where the original target slave node device is determined from the slave node devices subordinate to the second target master node device according to the location information of the mesh network device of which the attribute information is the mobile node.

The apparatus provided in the embodiment of the present application may implement the method of the embodiment shown in FIG. 2, the implementation principles and the technical effects thereof are similar, and it is not repeated here.

Figure 5:
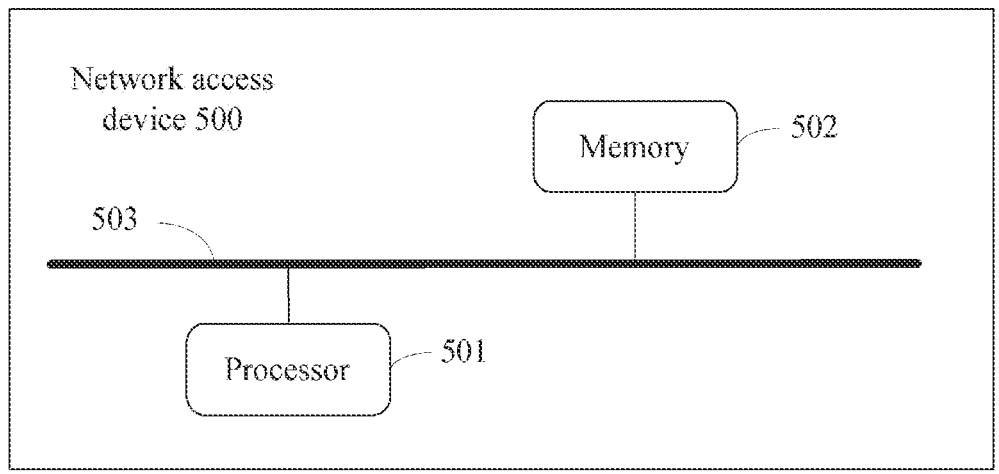
FIG. 5 is a schematic diagram of a hardware structure of a network access device provided in an embodiment of the present application.

FIG. 5 is a schematic diagram of a hardware structure of a network access device 500 provided in an embodiment of the present application, as shown in FIG. 5, the hardware structure provided in this embodiment includes at least one processor 501 and a memory 502, where the processor 501 and the memory 502 are connected by a bus 503.

In a specific implementation process, the at least one processor 501 executes the computer-executable instructions stored in the memory 502, so that the at least one processor 501 executes the method of the method embodiment described above.

The specific implementation process of the processor 501 refers to the method embodiment described above, the implementation principles and technical effects thereof are similar, and it is not repeated here in this embodiment.

In the above embodiment shown in FIG. 5, it should be understood that the processor may be a central processing unit (abbreviation: CPU), or may be other general purpose processors, a digital signal processor (abbreviation: DSP), an application specific integrated circuit (abbreviation: ASIC) or the like. The general purpose processor may be a microprocessor or the processor may be any conventional processor or the like. The steps of the method disclosed in connection with the application may be directly performed by a hardware processor or performed by a combination of hardware and software modules in the processor.

The memory may include a high-speed Random Access Memory (RAM) or may also include a non-volatile memory (NVM), such as at least one disk memory.

The bus may be an industry standard architecture (ISA) bus, a peripheral component interconnect (PCI) bus, an extended industry standard architecture (EISA) bus or the like. The bus may be divided into an address bus, a data bus, a control bus and the like. For ease of illustration, the bus in the drawings of the present application is not limited to only one bus or one type of bus.

An embodiment of the present application further provides a computer-readable storage medium in which computer-executable instructions are stored, and when a processor executes the computer-executable instructions, the network access method in the above method embodiment is implemented.

The above computer-readable storage medium may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The readable storage medium may be any available medium that can be accessed by a general purpose or special purpose computer.

An embodiment of the present application further provides a computer program product including a computer program that, when executed by a processor, implements the network access method of the above method embodiment.

An exemplary readable storage medium is coupled to a processor, so that the processor can read information from and write information to the readable storage medium. Of course, the readable storage medium may also be a component of the processor. The processor and the readable storage medium may be located in application specific integrated circuits (abbreviation: ASIC). Of course, the processor and the readable storage medium may also exist in the device as discrete components.

Those ordinary skilled in the art may understand that all or some of the steps to implement the above method embodiments may be implemented by a program instructing relevant hardware. The above program may be stored in a computer-readable storage medium. When the program is executed, the steps including the above method embodiments are performed; and the foregoing storage medium includes a ROM, a RAM, a magnetic disk, an optical disk, or any other medium that may store program codes.

Finally, it should be noted that the above embodiments are merely intended to describe the technical solutions of the present application and not to limit them; although the present application is described in detail with reference to the foregoing embodiments, those skilled in the art should understand that they may still modify the technical solutions described in the foregoing embodiments, or equivalently replace some or all of the technical features thereof; and these modifications or replacements do not depart the nature of the corresponding technical solutions from the scope of the technical solutions of the embodiments of the present application.

What is claimed is:

1. A network access method, comprising:
   acquiring device information of a mesh network device after registration;
   determining a first master node set to be connected according to the device information of the mesh network device, wherein the first master node set comprises at least one master node device;
   determining a first target master node device to be connected by the mesh network device from the first master node set based on a pre-stored master node selection manner, determining a device group corresponding to the first target master node device, and acquiring a target node device corresponding to a leaf node in the device group corresponding to the first target master node device; and
   connecting the mesh network device to the target node device to enable a terminal device connected to the mesh network device to realize network access through a communication link corresponding to the mesh network device.

2. The method according to claim 1, wherein the first master node set comprises one master node device, and the determining the first target master node device to be connected by the mesh network device from the first master node set based on the pre-stored master node selection manner comprises:
   determining the master node device in the first master node set as the first target master node device to be connected by the mesh network device based on the pre-stored master node selection manner.

3. The method according to claim 1, wherein the first master node set comprises a plurality of master node devices, and the determining the first target master node device to be connected by the mesh network device from the first master node set based on the pre-stored master node selection manner comprises:

determining weight values of the mesh network device and the master node devices in the first master node set based on the pre-stored master node selection manner to obtain a weight value set, wherein the weight values of the mesh network device and the master node devices in the first master node set are positively correlated with the number of nodes passed by the mesh network device to the master node devices in the first master node set;

acquiring a target weight value from the weight value set, wherein the target weight value is a weight value with a smallest value in the weight value set; and acquiring a first target master device corresponding to the target weight value from the first master node set.

4. The method according to claim 1, wherein the device information of the mesh network device comprises location information of the mesh network device, and the determining the first master node set to be connected according to the device information of the mesh network device comprises:

by taking the location information of the mesh network device as a center, determining first master node devices within a first preset range from the center according to the location information of the mesh network device, to obtain the first master node set.

5. The method according to claim 2, wherein the device information of the mesh network device comprises location information of the mesh network device, and the determining the first master node set to be connected according to the device information of the mesh network device comprises:

by taking the location information of the mesh network device as a center, determining first master node devices within a first preset range from the center according to the location information of the mesh network device, to obtain the first master node set.

6. The method according to claim 3, wherein the device information of the mesh network device comprises location information of the mesh network device, and the determining the first master node set to be connected according to the device information of the mesh network device comprises:

by taking the location information of the mesh network device as a center, determining first master node devices within a first preset range from the center according to the location information of the mesh network device, to obtain the first master node set.

7. The method according to claim 1, wherein the method further comprises:

when any mesh network device in a network is monitored to move, updating attribute information of a mobile mesh network device to a mobile node;

acquiring location information of the mesh network device of which the attribute information is the mobile node, and by taking the location information of the mesh network device of which the attribute information is the mobile node as a center, determining second master node devices within a second preset range from the center to obtain a second master node set;

determining a second target master node device from the second master node set according to the master node selection manner;

determining a target slave node device from slave node devices subordinate to the second target master node device according to the location information of the mesh network device of which the attribute information is the mobile node; and connecting the mesh network device of which the attribute information is the mobile node to the target slave node device.

8. The method according to claim 2, wherein the method further comprises:

when any mesh network device in a network is monitored to move, updating attribute information of a mobile mesh network device to a mobile node;

acquiring location information of the mesh network device of which the attribute information is the mobile node, and by taking the location information of the mesh network device of which the attribute information is the mobile node as a center, determining second master node devices within a second preset range from the center to obtain a second master node set;

determining a second target master node device from the second master node set according to the master node selection manner;

determining a target slave node device from slave node devices subordinate to the second target master node device according to the location information of the mesh network device of which the attribute information is the mobile node; and connecting the mesh network device of which the attribute information is the mobile node to the target slave node device.

9. The method according to claim 3, wherein the method further comprises:

when any mesh network device in a network is monitored to move, updating attribute information of a mobile mesh network device to a mobile node;

acquiring location information of the mesh network device of which the attribute information is the mobile node, and by taking the location information of the mesh network device of which the attribute information is the mobile node as a center, determining second master node devices within a second preset range from the center to obtain a second master node set;

determining a second target master node device from the second master node set according to the master node selection manner;

determining a target slave node device from slave node devices subordinate to the second target master node device according to the location information of the mesh network device of which the attribute information is the mobile node; and connecting the mesh network device of which the attribute information is the mobile node to the target slave node device.

10. The method according to claim 4, wherein the method further comprises:

when any mesh network device in a network is monitored to move, updating attribute information of a mobile mesh network device to a mobile node;

acquiring location information of the mesh network device of which the attribute information is the mobile node, and by taking the location information of the mesh network device of which the attribute information is the mobile node as a center, determining second master node devices within a second preset range from the center to obtain a second master node set;

determining a second target master node device from the second master node set according to the master node selection manner;

determining a target slave node device from slave node devices subordinate to the second target master node device according to the location information of the mesh network device of which the attribute information is the mobile node; and connecting the mesh network device of which the attribute information is the mobile node to the target slave node device.

11. The method according to claim 7, wherein before connecting the mesh network device of which the attribute information is the mobile node to the target slave node device, the method further comprises:
  determining whether the number of mesh network devices of which the attribute information is the mobile node currently connected by the target slave node device exceeds a preset number threshold; and
  if exceeding, performing a step of determining another target slave node device from the slave node devices subordinate to the second target master node device, according to the location information of the mesh network device of which the attribute information is the mobile node and steps thereafter again until determining that no new target slave node device exceeds the number threshold.

12. The method according to claim 11, wherein the method further comprises:
  if the number of the mesh network devices of which the attribute information connected by the slave node device subordinate to the second target master node device is the mobile node each exceeds the number threshold, adjusting the number threshold and connecting the mesh network devices of which the attribute information is the mobile node to an original target slave node device, wherein the original target slave node device is determined from the slave node devices subordinate to the second target master node device according to the location information of the mesh network device of which the attribute information is the mobile node.

13. A network access apparatus, comprising a processor and a memory; wherein, the memory is configured to store program codes; and
  the processor is configured to invoke the program codes stored in the memory to:
  acquire device information of a mesh network device after registration;
  determine a first master node set to be connected according to the device information of the mesh network device, wherein the first master node set comprises at least one master node device;
  determine a first target master node device to be connected by the mesh network device from the first master node set based on a pre-stored master node selection manner, determine a device group corresponding to the first target master node device, and acquire a target node device corresponding to a leaf node in the device group corresponding to the first target master node device; and
  connect the mesh network device to the target node device to enable a terminal device connected to the mesh network device to realize network access through a communication link corresponding to the mesh network device.

14. The network access apparatus according to claim 13, wherein the first master node set comprises one master node device, and the processor is further configured to invoke the program codes stored in the memory to:
  determine the master node device in the first master node set as the first target master node device to be connected by the mesh network device based on the pre-stored master node selection manner.

15. The network access apparatus according to claim 13, wherein the first master node set comprises a plurality of master node devices, and the processor is further configured to invoke the program codes stored in the memory to:
  determine weight values of the mesh network device and the master node devices in the first master node set based on the pre-stored master node selection manner to obtain a weight value set, wherein the weight values of the mesh network device and the master node devices in the first master node set are positively correlated with the number of nodes passed by the mesh network device to the master node devices in the first master node set;
  acquire a target weight value from the weight value set, wherein the target weight value is a weight value with a smallest value in the weight value set; and
  acquire a first target master device corresponding to the target weight value from the first master node set.

16. The network access apparatus according to claim 13, wherein the device information of the mesh network device comprises location information of the mesh network device, and the processor is further configured to invoke the program codes stored in the memory to:
  by taking the location information of the mesh network device as a center, determine first master node devices within a first preset range from the center according to the location information of the mesh network device, to obtain the first master node set.

17. The network access apparatus according to claim 13, wherein the processor is further configured to invoke the program codes stored in the memory to:
  when any mesh network device in a network is monitored to move, update attribute information of a mobile mesh network device to a mobile node;
  acquire location information of the mesh network device of which the attribute information is the mobile node, and by taking the location information of the mesh network device of which the attribute information is the mobile node as a center, determine second master node devices within a second preset range from the center to obtain a second master node set;
  determine a second target master node device from the second master node set according to the master node selection manner;
  determine a target slave node device from slave node devices subordinate to the second target master node device according to the location information of the mesh network device of which the attribute information is the mobile node; and
  connect the mesh network device of which the attribute information is the mobile node to the target slave node device.

18. The network access apparatus according to claim 17, wherein before connecting the mesh network device of which the attribute information is the mobile node to the target slave node device, the processor is further configured to invoke the program codes stored in the memory to:
  determine whether the number of mesh network devices of which the attribute information is the mobile node currently connected by the target slave node device exceeds a preset number threshold; and
  if exceeding, perform a step of determining another target slave node device from the slave node devices subordinate to the second target master node device, according to the location information of the mesh network device of which the attribute information is the mobile node and steps thereafter again until determining that no new target slave node device exceeds the number threshold.

19. The network access apparatus according to claim 18, wherein the processor is further configured to invoke the program codes stored in the memory to:
   if the number of the mesh network devices of which the attribute information connected by the slave node device subordinate to the second target master node device is the mobile node each exceeds the number threshold, adjust the number threshold and connect the mesh network devices of which the attribute information is the mobile node to an original target slave node device, wherein the original target slave node device is determined from the slave node devices subordinate to the second target master node device according to the location information of the mesh network device of which the attribute information is the mobile node.

20. A non-transitory computer-readable storage medium, wherein the computer-readable storage medium stores instructions which, when executed by a computer, enable the computer to perform the following steps:

acquiring device information of a mesh network device after registration;

determining a first master node set to be connected according to the device information of the mesh network device, wherein the first master node set comprises at least one master node device;

determining a first target master node device to be connected by the mesh network device from the first master node set based on a pre-stored master node selection manner, determining a device group corresponding to the first target master node device, and acquiring a target node device corresponding to a leaf node in the device group corresponding to the first target master node device; and connecting the mesh network device to the target node device to enable a terminal device connected to the mesh network device to realize network access through a communication link corresponding to the mesh network device.

* * * * *